Figure 1:
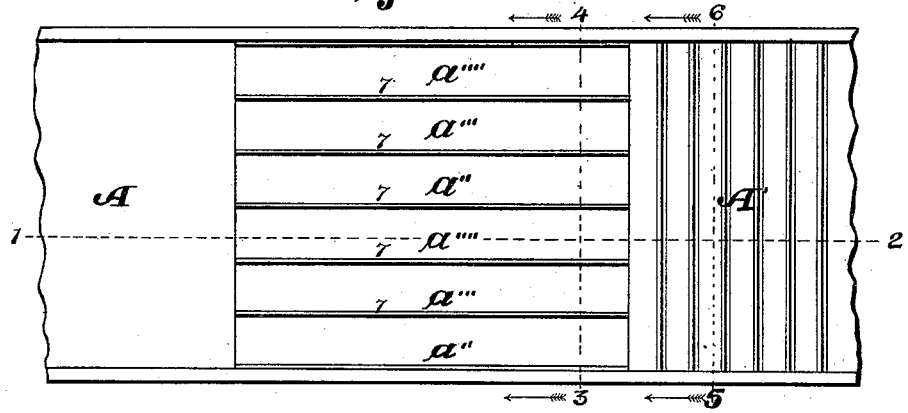

(No Model.) 2 Sheets—Sheet 1.

C. J. KENT.
MINING SLUICE BOX.

No. 477,373. Patented June 21, 1892.

WITNESSES
Guy H Johnson
D. H. Naylor

INVENTOR
Charles J. Kent
By Johnson & Johnson
his Attorneys.

(No Model.) 2 Sheets—Sheet 2.

C. J. KENT.
MINING SLUICE BOX.

No. 477,373. Patented June 21, 1892.

WITNESSES
Andy H Johnson
D. W. Naylor

INVENTOR
Charles J. Kent
By Johnson & Johnson
his Attorneys.

UNITED STATES PATENT OFFICE.

CHARLES J. KENT, OF VILLA PARK, COLORADO.

MINING SLUICE-BOX.

SPECIFICATION forming part of Letters Patent No. 477,373, dated June 21, 1892.

Application filed December 4, 1891. Serial No. 414,010. (No model.)

*To all whom it may concern:*

Be it known that I, CHARLES J. KENT, a citizen of the United States, residing at Villa Park, in the county of Arapahoe and State of Colorado, have invented a new and useful Improvement in Mining Sluice-Boxes, of which the following is a specification.

I have improved the sluice-washer or flume for use in placer-mining for separating and retaining the finer particles in treating mineral deposits by the joint action of water and the inclination of the sluice; and the object of my improvement is to provide a large area of settling or working surface in a comparatively small space within which to treat mineral deposits, and by which a comparatively small and portable device is adapted to handle a large quantity of ore and to effect a close saving of the mineral.

The particular matters of my improvement consist of certain novel parts and combinations of parts the several features of which will be severally and specifically pointed out in the claims concluding this specification.

I will now describe the device for treating mineral deposits which is illustrated in the annexed drawings, showing a sluice-box embodying the several features of my said invention separately and in combination.

My invention embodies provision for dividing the flowing body of the mineral-bearing pulp into comparatively small and narrow separate and distinct bodies or streams on the sluice-bottoms and delivering such separate and distinct flowing bodies or streams upon tables or surfaces, whereby the flow through the sluice in a wide body is received between the longitudinal walls of separate and distinct conductors to divide the flowing body into a multiple of narrow bodies without impeding their flow and the latter are delivered upon settling and collecting tables, whereon they spread out in their continued flow into comparatively shallow sheets, the better to insure the settling of the substances to be collected. For this purpose the longitudinal divisions in the bottom of the sluice are caused to deliver their separate and distinct flowing bodies upon settling and collecting surfaces arranged at different levels in the sluice and which for compactness I prefer to arrange one above the other, so that the intermediate and bottom surfaces will form continuations of the said longitudinal division-conduits and the vertical walls of the latter will rise above their bottoms and act as conductors receiving the flow from a surface or bottom common to all the conduits and distributing it upon surfaces or bottoms distinct from each other and having the function of dividing the flow from a single sheet into a multiple of sheets, so that the flow is first vertically and then horizontally divided at the working or settling end of the sluice, whereby I obtain the advantage of large capacity of settling or working surface with a compact and portable construction.

It will be understood that, while I have shown my improved working or settling device at the discharging end of the sluice, I may use more than one such device located at suitable distances apart in the bottom of the sluice when it is desirable to use a long sluice.

My invention also embodies provision whereby the mineral-bearing pulp is treated in separate and distinct strata at different levels in the same flow and under the same force, which greatly enhances the capacity of the saving device.

Figure 2:
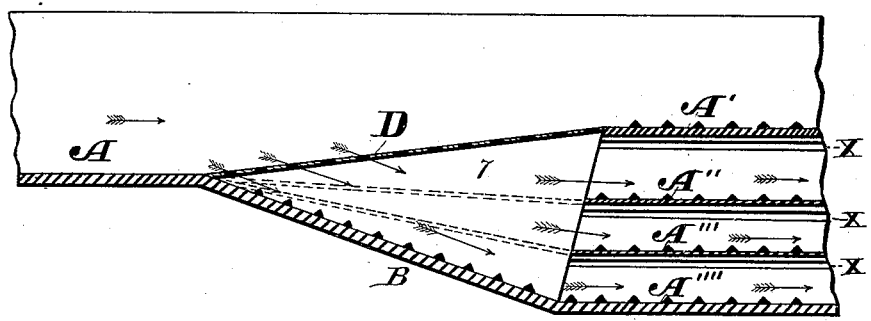
Figure 3:
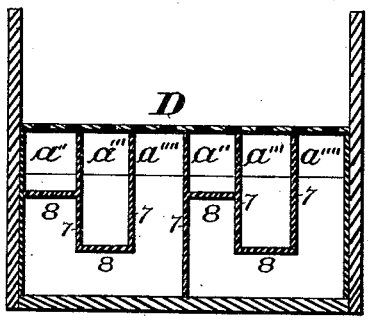
Figure 4:
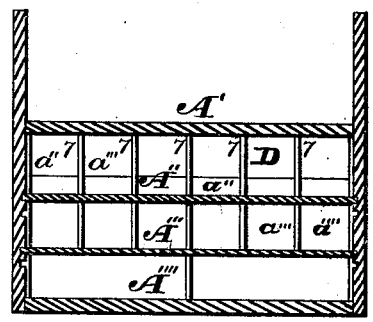
Figure 5:
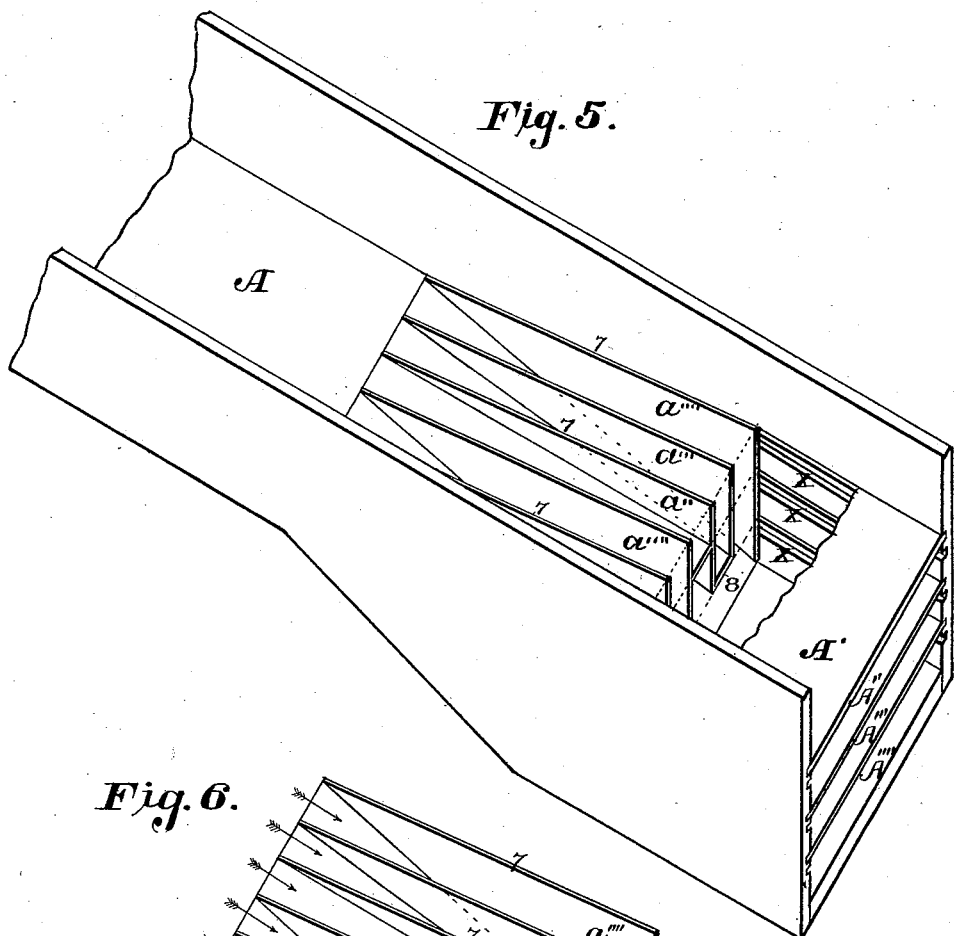
Figure 6:
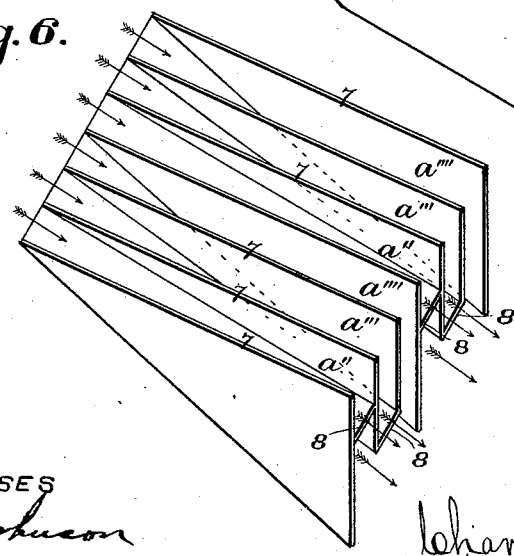

Referring to the drawings, Figure 1 represents in top view so much of the sluice as contains the settling device, the surface screen being removed therefrom. Fig. 2 shows a vertical longitudinal section of the same on the line 1 2 of Fig. 1. Fig. 3 shows a vertical transverse section of the same on the line 3 4 of Fig. 1. Fig. 4 shows a similar section on the line 5 6 of Fig. 1. Fig. 5 shows the working or settling device of the sluice in perspective, the distributing-tables being partially broken away; and Fig. 6 shows in perspective the device for longitudinally dividing the flow on the sluice-bottom.

The sluice or frame A is constructed from eight to sixteen feet long, about twelve inches wide, with side boards of a height determined by the conditions which I will presently state. The working or settling device is shown as forming the discharge end of the sluice, the bottom of which for this purpose has a downwardly-inclined part B to bring the bottom of the discharge end proper below the plane of the bottom above the working device. This inclined section is divided by plates 7, arranged longitudinally, the vertical walls of which form a multiple of channels or conductors $a''$ $a'''$ $a''''$, which receive the flow descending the sluice and divide it into a multiple of separate and distinct bodies or streams, which by reason of this incline are caused to pass through the conductors with an increased speed. These division-plates are preferably wedge-shaped and arranged with their points terminating at the upper end of the incline B and on a plane with the floor of the sluice, so as not to offer any obstruction to the free flow of the mineral-bearing pulp, while the lower edges of said plates terminate substantially vertical at the lower end of the said incline. I prefer to form the bottoms 8 of these conducting-divisions of different levels for co-operation with distributing and settling tables $A'$ $A''$ $A'''$, which I prefer to use in multiple relation to each other as terminal settling-surfaces for the substance to be saved. These multiple tables are placed in abutting relation to the vertical edges of the dividing-plates, preferably in horizontal parallel relation in planes coincident with the bottoms of the conducting-divisions, so as to form a continuation thereof, and at such distances apart as to allow the water and ore to pass freely over them from said division-conduits.

The height of the box at the working or settling device will be governed by the number of settling-tables used, and this would depend upon the capacity desired, the water-supply, and the nature of the material to be treated, because to properly treat a certain quantity of pulp within a certain time some deposits would require more working or settling surface than others.

A screen D is placed upon and over the entire surface of the division-plates and extends from the inner edge of the top table $A'$ to the points of said plates, so as to form a continuous surface connecting the settling-surface of the top table with the flow-surface of the sluice. The function of this screen is to grade the separation of the ore, so that the finer particles will pass with the flow through the screen into and through the division-conduits and into and over the tables below the screen, while the particles too large to pass through the meshes of the screen are carried over it with the force of the flow upon and over the top table.

The settling and retaining function of the tables is effected by providing them with surface riffles, blankets, or amalgamated plates of any desired construction that will permit the flow of the earthy substances and coarser particles to pass off at the ends of the tables, while retaining the mineral. It will be understood that the settling-tables above the lower one, which is the bottom of the sluice, may be made adjustable to vary the height of the spaces between them by means of small cleats or grooves, as seen in Figs. 2 and 4, so that they can be slid in and out, and thus facilitate cleaning the whole settling or working device. In such adjustment the tables must always be placed so as to receive and distribute the flow from the division-conduits.

It will be understood that the division-conduits are constructed and arranged so as to make any desired division or subdivision of the flow down the sluice and to properly distribute the flow upon and over tables and that these division-conduits may be wide, so as to use one to each table, or they may be narrow, so as to use two or more to each table. It will also be understood that for treating certain kinds of material—such, for instance, as having about equal bulk of coarse and fine matter—the device may be used without the division-conduits and the intermediate settling-tables, in which case the coarser grade of the pulp will be carried over the screen and upon and over the upper riffled table, which forms a prolongation of the screen, while the finer particles and earthy matter will pass through the screen and pass off upon and over the lower bottom part of the sluice, which forms the lower settling-table. In treating mineral deposits which contain no coarse material the screen may be dispensed with, in which case the flow in the sluice would be received by the division-conduits and conducted in separate or distinct bodies or streams over and upon the superposed tables arranged in abutting relation to the ends of the conduits, as stated.

The separation of the coarse from the finer material and the movement of each under separate flows in the same direction, but at different levels, gives the important advantage of avoiding the loss which is usual in sluice-separation in which the coarse and the fine material are treated together in the same flow and in which the tendency of the coarser substances is to dislodge and carry off the finer substances from their resting-places, and thereby cause a loss. This treatment of the pulp, therefore, in separate and distinct strata at different levels in the same flow and under the same force and under different rates of flow (for the lower flow will be faster than the upper flow) is an important feature of my invention and greatly enhances the capacity of the saving device by preventing crowding or overloading the working or settling surface, in which condition the material would become packed more or less and the mineral be carried off with the flow.

The screen, the conduit-forming plates, and the table may be made removable for cleaning and to adapt the sluice-box for treating different kinds and quantities of mineral earth and for renewal when worn out.

The pulp is fed with the water upon the upper end of the sluice, and, flowing down therein by the joint action of the water and the inclination of the sluice, is divided by the division-conduits into independent parallel bodies without arresting the flow, and which deliver direct and spread it over settling-tables grouped in a nest in superposed relation. In this relation the tables form shelves, which stand across the multiple conduits, so that the separate streams from the latter will spread out from each side of the conduit as it becomes distributed over the tables. This sidewise-spreading movement, while having the effect of thinning out the flow, also has the effect of retarding the speed of the flow, and thereby aids the settling function of the riffled surfaces and reduces the tendency of the flow to dislodge and carry off the mineral particles from the settling-surfaces.

If desired, the bottoms of the division-conduits may also be provided with settling or collecting riffles, and it is obvious that these conduits may be formed together in a nest or in sections and that the tables may be formed together in a nest, as may be desired.

Referring to Fig. 2, it will be seen that the screen inclines upward from the sluice-bottom and that it may be adjusted at a higher or lower level and correspondingly increase or diminish the inclination of the screen, as may be desired.

I claim as my invention—

1. The combination, with the well-known inclined-surface sluice-box or flume for washing and collecting mineral deposits, having at its lower end a continuous collecting-surface section of greater inclination and terminating in a settling-table, of a settling-table above said bottom table and a flow-screen extending over the surface-collecting section having the greatest inclination and connecting the said top settling-table with the sluice-surface at its junction with the said surface-section of greatest inclination, substantially as described.

2. The combination, with the well-known inclined-surface sluice-box or flume for washing and collecting mineral deposits, having at its lower end a continuous collecting-surface section of greater inclination, of a working or settling device at the lower end of the latter, consisting of a multiple of horizontal settling-tables arranged at different levels in superposed relation, and a multiple of longitudinal conduits arranged to divide said collecting-surface section of greatest inclination at different levels and directly connecting the surface of the sluice-box with the said settling-tables at inclinations varying with the levels of said tables, substantially as described, for the purpose stated.

3. The combination of the sluice or flume with a multiple of longitudinally-arranged conduits arranged at different levels, a multiple of settling-tables, and a screen supplementing said conduits and connecting the upper settling-table with the sluice-bottom, substantially as described, for the purpose stated.

4. In a sluice or flume for washing and concentrating mineral deposits, the combination of the longitudinal conduits, adjustable tables co-operating therewith, and a screen supplementing said conduits arranged to connect the upper table with the sluice-bottom, substantially as described, for the purpose stated.

5. In a sluice or flume for washing and concentrating mineral deposits, a terminal settling-table below the plane of the sluice-bottom, connecting the latter by an incline, a multiple of settling-tables supplementing the said terminal table, a multiple of longitudinal wedge-shaped plates forming conduits on the said incline, terminating at their points flush with the sluice-floor, and a screen supplementing said plates, substantially as described, for the purpose stated.

6. An inclined-surface sluice-box or flume for washing and collecting mineral deposits, having at its lower end a continuous collecting-surface section of greater inclination and terminating in a settling-table, and an overflow-screen connecting the inner edge of the latter table with the sluice-box surface and covering the said box collecting-surface section of greatest inclination, substantially as described.

7. In a sluice or flume for washing and concentrating mineral deposits, the combination therewith of a multiple of plates forming narrow conduits declining from the sluice-bottom and terminating at different levels, with a multiple of settling-tables arranged across the delivery ends of said conduits and having an area greater than the combined area of the communicating conduits, substantially as described.

8. An inclined-surface sluice-box or flume for washing and collecting mineral deposits, terminating at its lower end in a section formed of a surface-section of greater inclination than the sluice-box and divided by vertical longitudinal divisions having different bottom-levels, a terminal part abutting said divisions and divided by horizontal transverse superimposed collecting or settling tables of levels corresponding to those of the surface-section divisions of greatest inclination, but of greater area than the said longitudinal divisions, substantially as described, for the purpose stated.

In testimony whereof I have signed this specification in the presence of two subscribing witnesses.

CHARLES J. KENT.

Witnesses:
L. E. DENSMORE,
A. C. DICKSON.